United States Patent [19]

Moore et al.

[11] Patent Number: 5,609,180
[45] Date of Patent: Mar. 11, 1997

[54] LIQUID ALKALI SYSTEM FOR FIBER REACTIVE DYEING

[75] Inventors: Samuel B. Moore, Burlington; Edwin T. Turner, Greensboro; James F. Leuck, Gibsonville, all of N.C.

[73] Assignee: Burlington Chemical Co., Inc., Burlington, N.C.

[21] Appl. No.: 549,622

[22] Filed: Oct. 27, 1995

Related U.S. Application Data

[60] Continuation-in-part of Ser. No. 327,041, Oct. 21, 1994, abandoned, which is a division of Ser. No. 874,754, Apr. 27, 1992, Pat. No. 5,382,262.

[51] Int. Cl.$^6$ .................................................. G05D 11/13
[52] U.S. Cl. ................ 137/101.19; 137/101.21; 137/897
[58] Field of Search .................... 137/101.19, 101.21, 137/897, 898

[56] References Cited

U.S. PATENT DOCUMENTS

| | | | |
|---|---|---|---|
| 3,272,217 | 9/1966 | Young | 137/101.19 |
| 4,277,254 | 7/1981 | Hanson | 137/101.19 X |
| 4,433,701 | 2/1984 | Cox et al. | 137/101.19 |
| 4,521,332 | 6/1985 | Milora . | |
| 4,555,348 | 11/1985 | Moran . | |
| 4,737,308 | 4/1988 | Pearson . | |
| 4,869,844 | 9/1989 | Johnson . | |
| 5,029,100 | 7/1991 | Young et al. | 137/101.19 X |
| 5,059,407 | 10/1991 | Wallace et al. . | |
| 5,198,198 | 3/1993 | Gladfelter et al. . | |
| 5,207,800 | 5/1993 | Moore . | |
| 5,358,177 | 10/1994 | Cashmore | 137/606 X |
| 5,368,059 | 11/1994 | Box et al. | 137/101.21 X |
| 5,372,741 | 12/1994 | Tomaszewski . | |

FOREIGN PATENT DOCUMENTS

| | | | |
|---|---|---|---|
| 0283114 | 9/1988 | European Pat. Off. . | |
| 2081119 | 2/1982 | United Kingdom | 137/897 |

*Primary Examiner*—Gerald A. Michalsky
*Attorney, Agent, or Firm*—Rhodes, Coats & Bennett, L.L.P.

[57] ABSTRACT

Liquid caustic compositions for use in reactive dyeing, having total and alkaline activities approximating the total and alkaline activities of a predetermined liquid caustic composition are prepared by providing a source of water; providing a container of concentrated sodium hydroxide solution; providing a container of liquid buffered alkali solution; providing a mixer communicating with the containers; providing at least one liquid caustic solution storage tank in communication with the mixer; providing flow meters communicating with the mixer to monitor the quantities of sodium hydroxide and buffered alkali flowing to the mixer; determining the total and active alkalinities of the target liquid caustic composition; determining the quantities of sodium hydroxide and buffered alkali solutions required to provide a liquid caustic solution having total and active alkalinities approximating the total and active alkalinities of the target solution; diluting the concentrated sodium hydroxide with the water to form dilute sodium hydroxide; feeding controlled quantities of the dilute sodium hydroxide and buffered alkali to the mixer; and mixing the sodium hydroxide and buffered alkali to form the desired liquid caustic solution.

6 Claims, 1 Drawing Sheet

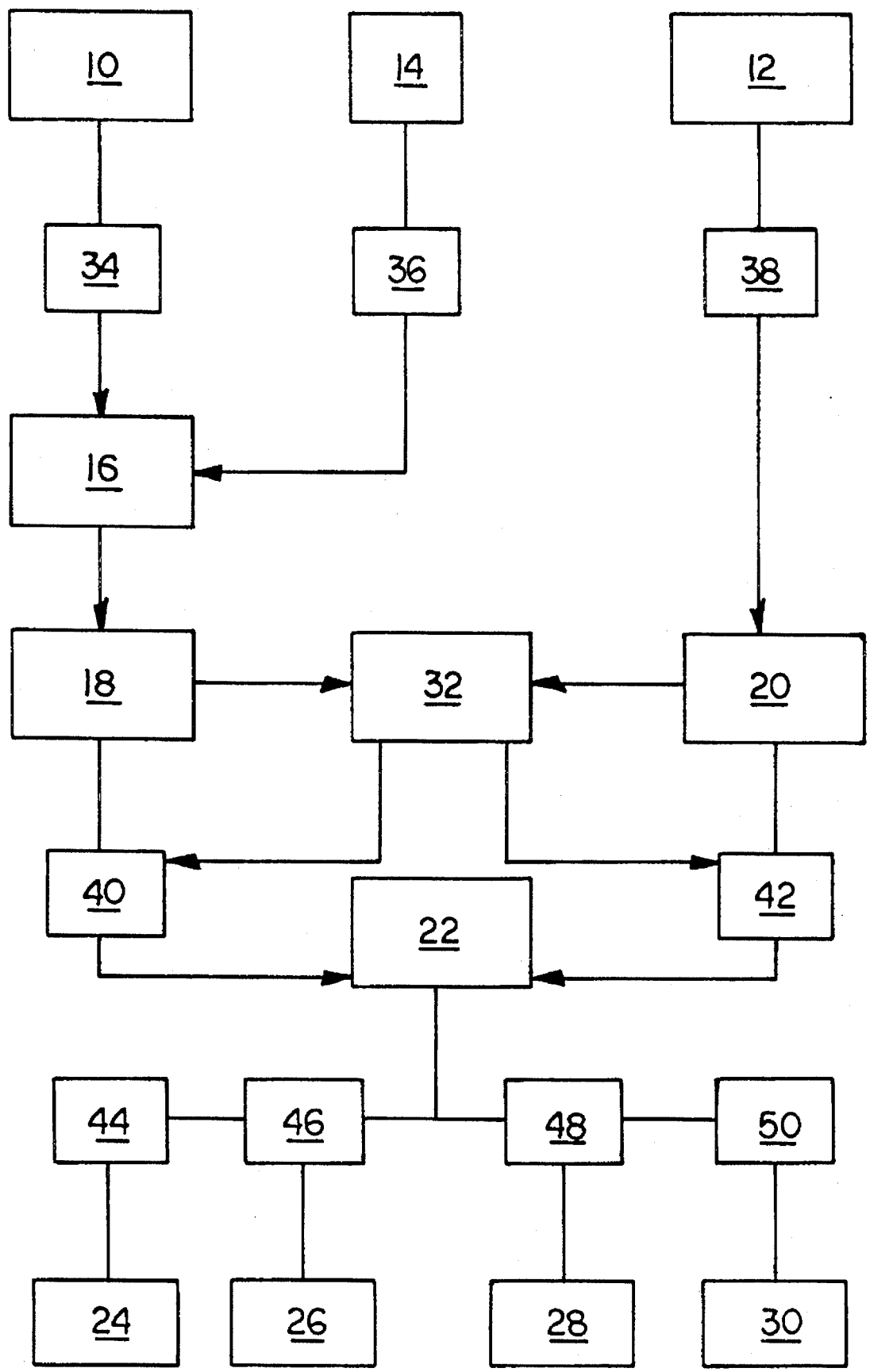

LIQUID ALKALI SYSTEM FOR FIBER REACTIVE DYEING

CROSS-REFERENCE TO RELATED APPLICATIONS

This application is a continuation-in-part of U.S. patent application Ser. No. 08/327,041, filed Oct. 21, 1994, now abandoned, which, in turn is a divisional of U.S. patent application Ser. No. 07/874,754, filed Apr. 27, 1992, now U.S. Pat. No. 5,382,262, issued Jan. 17, 1995.

BACKGROUND OF THE INVENTION (1) Field of the Invention

The present invention relates generally to a method and apparatus for preparing liquid caustic solutions for use in fiber reactive dye baths, and more particularly to a method and apparatus for preparing liquid caustic solutions having a predetermined total and active alkalinities matching the reactivity requirements of a variety of fiber reactive dyes.

(2) Description of the Prior Art

Fiber reactive dyes are widely used in the dyeing of cotton and cotton blend fibers and fabrics. These dyes are easy to apply and produce brilliant shades, fastness, penetration and leveling. Exemplary fiber reactive dyes include trichloro pyrimidine, monochloro triazine, vinyl sulfone, dichloro quinoxaline, monofluoro triazine, difluoro-monochloro pyrimidine, dichloro triazine, and mixtures thereof.

Fiber reactive dyes are anionic in nature, and include a chromophore to give color to the dye and a reactive group which forms a strong covalent chemical bond between the dye molecule and the fiber, e.g., the hydroxyl group of a cellulose fiber. An alkaline dye bath is required in order to achieve the desired reaction or "fixing" between the dye molecule and the fiber. Various alkali compositions have been used in preparing fiber reactive dyes baths. These compositions include sodium hydroxide, potassium hydroxide, trisodium phosphate, sodium tripolyphosphate, sodium carbonate, sodium bicarbonate and sodium silicate.

Another composition, described in U.S. Pat. No. 4,555,378 to Moran, is a liquid phosphate system sold under the trademark Alkaflo by Sybron Chemicals of Birmingham, N.J. Another commercial liquid alkali or caustic is sold under the trade name Burco NP-Q Salt by Burlington Chemical Co., Burlington, N.C. This latter product is based on a mixture of sodium hydroxide, potassium hydroxide, soda ash, citrate and acrylate salt.

Also, U.S. Pat. No. 5,382,262 to Moore (hereinafter the '262 patent), assigned to the assignee of the present invention and incorporated herein by reference in its entirety, describes a buffered liquid alkali composition for use in fiber reactive dyeing formed by the "in situ" reaction of carbon dioxide with liquid potassium hydroxide i.e., liquid caustic potash, until the pH value of a 2% solution is about 12, resulting in an aqueous buffered alkali comprised of a super saturated mixture of potassium carbonate and potassium hydroxide. Potassium citrate and potassium polyacrylate may be included as dispersants and crystallization inhibitors.

Fiber reactive dyes are characterized by different rates of reactivity, requiring the use of a dye bath having sufficient total alkalinity to achieve the desired reaction between the dye and the fiber, but insufficient alkalinity to cause hydrolysis of the dye with the water in the dye bath, forming a nonreactive pigment. Thus, the user must select an alkali composition that will have a high enough total alkalinity to achieve the desired reaction, but sufficient buffering to avoid hydrolysis.

Fiber reactive dyes normally include instructions to guide the user in alkali selection. These instructions include recommended alkali baths for use in dyeing of fibers with the particular fiber reactive dye. The user can then prepare an alkali bath using the alkali composition recommended, and often sold, by the dye manufacturer. While optimum dyeing conditions can normally be achieved in this manner, practical and economic difficulties arise when the user is involved in dyeing different materials using different dyes. Under these circumstances, which commonly arise within dyeing facilities, it is necessary for the user to store separate alkali compositions for each dye to be used, and to maintain a separate supply source for each alkali composition needed.

Thus, there remains a need for a new and improved method and apparatus for eliminating the necessity for stockpiling of separate alkali compositions for each dye used while, at the same time, eliminating the need for a separate supply source for each alkali bath thereby resulting in a considerable improvement in operating costs and convenience.

SUMMARY OF THE INVENTION

The present invention is directed to a method and apparatus for preparing alkali solutions having predetermined total and active alkalinities for use in a fiber reactive dye bath. The invention is related especially to a method and apparatus that use only two sources, e.g., tanks or containers, of ingredients to provide an infinite range of liquid alkalis having total and active alkalinities approximating those of other liquid alkalis recommended for use with given fiber reactive dyes, thus eliminating the need to stockpile separate alkali solutions for each dye used. More specifically, the invention requires a source of aqueous sodium hydroxide, and a source of buffered alkali.

If a container of concentrated sodium hydroxide is used to reduce storage space requirements, a source of water will also be provided to dilute the concentrated sodium hydroxide to a working concentration. A first mixer will be provided to mix given amounts of concentrated sodium hydroxide and water.

A second mixer is provided for mixing predetermined quantities of the dilute sodium hydroxide and the buffered alkali to form the liquid caustic solution. For simplicity of operation, the mixers are preferably static mixers. Flow meters, preferably mass flow meters, may be used to control the quantities of dilute sodium hydroxide and buffered alkali fed to the second mixer. Storage tanks may be included to store different liquid caustic solutions prepared by this method. Additionally, a programmable controller, such as a computer with programmable software, can be used to monitor the flow meters and control operation of the elements of the system.

The method of the present invention is directed to production of liquid caustic solutions with total and active alkalinities approximating those of a predetermined caustic solution. In practicing the method, the total and active alkalinities of a target solution are determined. A ratio of sodium hydroxide and buffered alkali required to match the total and active alkalinities of the target solution is then determined, and quantities of the sodium hydroxide and buffered alkali are mixed to form the desired liquid caustic solution.

As used herein, the term "buffered alkali solution" means an alkali solution containing sodium or potassium hydroxide, which are blended with additives to achieve a lower pH while retaining neutralization equivalency. An example of a buffered alkali solution suitable for use with the present invention is the buffered alkali composition disclosed in the '262 patent to Moore.

The total and active alkalinities of a target solution may be determined by standard titration methods. For example, the target solution may be titrated with standard acids to pH's of 3.7 and 8.4 to determine respective total and active alkalinities.

The ratio of sodium hydroxide and buffered alkali required to match the total and active alkalinities of the target solution can be determined by curve fitting techniques known to those skilled in the chemical arts, which matches concentration versus pH and total neutralization equivalent.

Accordingly, one aspect of the present invention is to provide an apparatus for producing a liquid caustic solution having predetermined total and active alkalinities comprising a source of liquid sodium hydroxide; a source of buffered alkali; and a mixer for mixing liquid sodium hydroxide and buffered alkali. The apparatus may additionally include metering means for controlling the quantities of sodium hydroxide and buffered alkali, and a programmable controller for regulating the quantities of sodium hydroxide and buffered alkali. A water source is also included if dilution of the sodium hydroxide is desired.

Another aspect of the present invention is to provide an apparatus for producing a liquid caustic solution for use in reactive dyeing of cotton and cotton blended fibers comprising a water source; a first storage container for holding concentrated sodium hydroxide solution; a second storage container for holding a liquid buffered alkali solution; a first mixer communicating with the water source and the first storage container to produce diluted sodium hydroxide; a second mixer in communication with the first mixer and the second storage container to mix dilute sodium hydroxide and buffered alkali; at least one liquid caustic solution storage tank in communication with the second mixer; a first flow meter for monitoring the quantity of material flowing from the first mixer to the second mixer; a second flow meter for monitoring the quantity of material flowing from the second storage tank to the second mixer; and a programmable controller in communication with the first and second flow meters for controlling the quantities of materials.

Still another aspect of the present invention is to provide a process for preparing a liquid caustic composition for use in reactive dyeing, the composition having the properties of a target liquid caustic composition, including the steps of determining the total and active alkalinities of a target liquid caustic composition; providing aqueous solutions of sodium hydroxide and a buffered alkali; determining the ratio of the sodium hydroxide and buffered alkali solutions required to approximate the total and active alkalinities of the target composition; and mixing predetermined quantities of the sodium hydroxide and buffered alkali to form the liquid alkali composition. Additionally, the process may include the step of diluting concentrated sodium hydroxide to form the aqueous sodium hydroxide solution.

Still another aspect of the invention is to provide a process for preparing a liquid caustic composition for use in reactive dyeing, the composition having total and alkaline activities approximating the total and alkaline activities of a target liquid caustic composition, including the steps of providing a source of sodium hydroxide solution; providing a source of liquid buffered alkali solution; providing a mixer communicating with the first and second sources; providing at least one liquid caustic solution storage tank in communication with the mixer; providing flow meters for controlling the quantities of sodium hydroxide and buffered alkali flowing to the mixer; providing a programmable controller in communication with the flow meters; determining the total and alkaline activities of a target liquid caustic composition; determining the quantities of the sodium hydroxide and buffered alkali solutions required to provide a liquid caustic solution having total and alkaline activities approximating the target and alkaline activities of the target solution; programming the desired quantities into the programmable controller; feeding sodium hydroxide and buffered alkali to the mixer; monitoring the quantities of sodium hydroxide and buffered alkali with said flow meters; and mixing said sodium hydroxide and buffered alkali to form the desired liquid caustic solution.

It is still a further aspect of the invention to include as part of the foregoing process the steps of providing a source of water; providing a source of concentrated sodium hydroxide; providing a diluting mixer; and feeding predetermined quantities of water and concentrated sodium hydroxide to the diluting mixer.

These and other aspects of the present invention will become apparent to those skilled in the art after a reading of the following description of the preferred embodiment when considered with the drawings.

BRIEF DESCRIPTION OF THE DRAWING

The FIGURE is a diagram of the present apparatus.

DESCRIPTION OF THE PREFERRED EMBODIMENTS

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in the Figure, the apparatus of the present invention is comprised of a first storage tank 10 for holding concentrated sodium hydroxide and a second storage tank 12 for holding a buffered alkali composition. A water supply 14, which may be a tank or faucet, is also included. Liquid sodium hydroxide and water flowing from tank 10 and water supply 14, respectively, are fed to a static mixer 16 where they are mixed to form dilute sodium hydroxide. The dilute sodium hydroxide is then metered from mixer 16 by flow meter 18, which is a K-Flow mass flow meter manufactured by ABB K-Flow, Inc. of Millville, N.J. This type of flow meter is capable of precisely measuring the amount of diluted sodium hydroxide to within 0.001%.

Buffered alkali is fed from tank 12 through flow meter 20, of the same construction as flow meter 18. Dilute sodium hydroxide from meter 18 and buffered alkali from meter 20 are then mixed in static mixer 22 and directed to one of storage tanks 24–30. The amounts of sodium hydroxide and buffered alkali are controlled by a programmable controller 32, which may be a computer with appropriate software. Controller 32 is adapted to receive information from meters 18 and 20 and control the opening and closing of valves 40–42 to regulate flow of the solutions. Additionally, controller 32 controls valves 44–50 to direct the liquid alkali solution of the appropriate storage tank. Cut-offs 34–38 are optional.

In operation, the total and active alkalinities of the caustic solution to be duplicated are determined through titration. The quantities of sodium hydroxide and buffered alkali required to approximate these total and active alkalinities are then determined and programmable controller 32 is then programmed based on these values.

Appropriate quantities of sodium hydroxide and water are then fed from supply sources 10 and 14 through static mixer 16, and the desired quantity of the dilute sodium hydroxide is fed through meter 18 to static mixer 22. At the same time, the desired quantity of buffered alkali is fed from supply source 12 through flow meter 20 to static mixer 22. The desired liquid alkali solution exiting static mixer 22 is then fed to one of storage tanks 24–30.

While the present invention has been described in terms of the preparation of solutions for use in the dyeing of cotton and cotton blends, it will be apparent to one skilled in the art that these solutions will also find utility in the dyeing of other fabrics or fibers, as well as in paper manufacture, waste treatment, laundry, dishwashing, etc.

The buffered alkali supplied from tank 12 may be, for example, the buffered alkali composition disclosed in the '262 patent to Moore. This composition is manufactured and sold under the tradename SA-200 by Burlington Chemical Company, Inc. of Burlington, N.C. Other buffered alkali compositions could also be used in the present invention, however.

Certain modifications and improvements will occur to those skilled in the art upon a reading of the foregoing description. By way of example, the desired liquid alkali composition can be sent directly to the dye machine instead of to an intermediate holding tank. Also, dilute sodium hydroxide can be stored in the supply tank, eliminating the need for the dilution step. It should be understood that all such modifications and improvements have been deleted herein for the sake of conciseness and readability but are properly within the scope of the following claims.

I claim:

1. An apparatus for producing a liquid caustic solution for use in reactive dyeing of cotton and cotton blended fibers comprising:

(a) a first storage container containing a sodium hydroxide solution;

(b) a second storage container containing a liquid buffered alkali solution;

(c) a mixer in communication with the first and second storage containers to continuously receive and mix sodium hydroxide and buffered alkali to form and supply said liquid caustic solution; and (d) first and second mass flow meters to monitor the quantities of sodium hydroxide and buffered alkali received by said mixer.

2. The apparatus of claim 1, further including at least one storage container in communication with said mixer to receive said liquid caustic solution.

3. The apparatus of claim 1, further including a programmable controller in communication with said meters to control the quantities of sodium hydroxide and buffered alkali.

4. The apparatus of claim 1, further including a water supply and a diluting mixer in communication with said water supply and said first storage tank for diluting said sodium hydroxide.

5. The apparatus of claim 1, wherein said mixer is a static mixer.

6. The apparatus of claim 1, wherein the liquid buffered alkali solution is a mixture of potassium carbonate and potassium hydroxide.

* * * * *